(12) United States Patent
Jin et al.

(10) Patent No.: US 6,470,374 B1
(45) Date of Patent: Oct. 22, 2002

(54) CARRY LOOK-AHEAD FOR BI-ENDIAN ADDER

(75) Inventors: Daming Jin, Fort Collins, CO (US); Dean A. Mulla, Saratoga, CA (US); Tom Grutkowski, Fort Collins, CO (US)

(73) Assignees: Hewlett-Packard Company, Palo Alto, CA (US); Intel Corporation, Santa Clara, CA (US)

( * ) Notice: Subject to any disclaimer, the term of this patent is extended or adjusted under 35 U.S.C. 154(b) by 0 days.

(21) Appl. No.: 09/510,129

(22) Filed: Feb. 21, 2000

(51) Int. Cl.[7] ................................................. G06F 7/50
(52) U.S. Cl. ........................ 708/700; 708/710; 708/714
(58) Field of Search ................................. 708/670, 671, 708/672, 700, 706, 710, 711, 712, 713, 714

(56) References Cited

U.S. PATENT DOCUMENTS 5,285,406 A  *  2/1994  Lynch et al. ................. 708/711
5,838,602 A  * 11/1998  Feiller et al. ................ 708/714
6,405,233 B1 *  6/2002  Mathews et al. ........... 708/670

* cited by examiner

*Primary Examiner*—Ohuong Dinh Ngo

(57) ABSTRACT

The inventive adder can perform carry look-ahead calculations for a bi-endian adder in a cache memory system. The adder can add one of +/−1, 4, 8, or 16 to a loaded value from memory, and the operation can be a 4 or 8 byte add. The inventive adder comprises a plurality of byte adder cells and carry look-ahead (CLA) logic. The adder cells determine which of themselves is the least significant bit (LSB) byte adder cell. The LSB cell then adds one of the increment values to its loaded value. The other cells add 0x00 or 0xFF, depending upon the sign of the increment value, to a loaded value from memory. Each adder performs two adds, one for a carry-in of 0, and the other for a carry in of 1. Both results are sent to a MUX. The CLA logic determines each of the carries, and provides a selection control signal to each MUX. of the different cells.

20 Claims, 2 Drawing Sheets

CARRY LOOK-AHEAD FOR BI-ENDIAN ADDER

TECHNICAL FIELD

This invention relates in general to computer systems, and in specific to an arrangement for a carry look-ahead for bi-endian adder.

BACKGROUND

Computer systems may employ a multi-level hierarchy of memory, with relatively fast, expensive but limited-capacity memory at the highest level of the hierarchy and proceeding to relatively slower, lower cost but higher-capacity memory at the lowest level of the hierarchy. The hierarchy may include a small fast memory called a cache, either physically integrated within a processor or mounted physically close to the processor for speed. The computer system may employ separate instruction caches and data caches. In addition, the computer system may use multiple levels of caches. The use of a cache is generally transparent to a computer program at the instruction level and can thus be added to a computer architecture without changing the instruction set or requiring modification to existing programs.

Computer processors typically include cache for storing data. When executing an instruction that requires access to memory (e.g., read from or write to memory), a processor typically accesses cache in an attempt to satisfy the instruction. Of course, it is desirable to have the cache implemented in a manner that allows the processor to access the cache in an efficient manner. That is, it is desirable to have the cache implemented in a manner such that the processor is capable of accessing the cache (i.e., reading from or writing to the cache) quickly so that the processor may be capable of executing instructions quickly. Caches have been configured in both on chip and off-chip arrangements. On-processor-chip caches have less latency, since they are closer to the processor, but since on-chip area is expensive, such caches are typically smaller than off-chip caches. Off-processor-chip caches have longer latencies since they are remotely located from the processor, but such caches are typically larger than on-chip caches.

Cache systems typically perform addition as part of their memory operations. Binary addition is similar to numerical addition. The most basic form of binary addition entails starting with the least significant digit, and adding the two numbers, and moving a carry, if any, into the next significant digit addition. For example, consider the addition of the bit stream 010 and a bit stream 111. The addition of the least significant bits is 0+1, with a sum of 1, and a carry out of 0. The addition of the next significant bits are 1+1 plus a carry in of 0, with a sum of 0, and a carry out 1. The addition of the next significant bits are 0+1 plus a carry in of 1, with a sum of 0, and a carry out 1. Thus, the addition yields 001 plus a carry out of 1, or 1001.

The sequential addition described above works well for small bit streams, e.g. 3 bits, but becomes inefficient for large bit streams, e.g. 64 bits. Thus, the prior art uses carry select addition, which is similar to sequential addition, but breaks the bit streams into smaller blocks and performs two calculations, a first assuming that the carry bit is a zero, the second assumes the carry bit is a one. For example, consider a bit stream of 100101 which is added to bit stream 110001, this would yield 1010110 using sequential addition. With carry select addition these streams would be split into blocks 100 & 101 and 110 & 001, respectively. The addition of the blocks are 101+001 and 100+110. Now 100+110 would be calculated in two ways, the first assumes a carry in of 0 and the second assumes a carry in of 1. Thus, 100+110+0=1010, and 100+110+1=1011. The addition of 101+001=110 with a carry out of 0, thus the carry in of 0 calculation for the 100+110 addition should be used. The two calculations are then concatenated together to form (1010) (110)=1010110. Note that the additions of the two segments can be performed in parallel. Further note that a 2 to 1 multiplexer (MUX) is typically used to select between the carry 0 and carry 1 calculations.

The addition of two binary bits have four possible scenarios for the two operands, i.e. 00, 01, 10, and 11. The behavior of the operands is characterized in terms of the carry out of the operands. The behavior can be characterized as propagate, kill, or generate (PKG). Thus the four possible combinations are encoded as one-of-three encoding, or PKG encoding. Thus, the carry out of two operand bits can be represented by PKG encoding. If the two operand bits tend to propagate a carry, i.e. the carry out equals the carry in, then these operands are considered P operands. The P operands are 01 and 10. Thus, if a carry is 1, then (0+1)+1 equals 0 with a carry of 1. Similarly, if a carry is 0, then (0+1)+0 equals 1 with a carry of 0. The operands of (1+0) behave similarly. If the two operand bits tend to kill a carry, i.e. the carry out always equals 0, then these operands are considered K operands. The K operands are 00. Thus, if a carry is 1, then (0+0)+1 equals 1 with a carry of 0. Similarly, if a carry is 0, then (0+0)+0 equals 0 with a carry of 0. If the two operand bits tend to generate a carry, i.e. the carry out always equals 1, then these operands are considered G operands. The G operands are 11. Thus, if a carry is 1, then (1+1)+1 equals 1 with a carry of 1. Similarly, if a carry is 0, then (1+1)+0 equals 0 with a carry of 1. Accordingly, the carry out of two operand bits can be represented by the three signals P, K and G.

Most caches use binary addition as part of their semaphore operations. Semaphore operations are atomic read/modify/write operations, meaning that the operations cannot be snooped or otherwise interrupted by normal interrupt operations. For example, a fetch-add instruction is an instruction that software uses to perform an atomic memory read plus an ALU operation plus a memory write. This causes a value to read from memory, a constant to be added to the value, and then the new value written back to memory. Software uses the semaphores for communication mechanisms. Semaphores are basically flags indicating who has the right to modify particular resources in a system. The atomic nature prevents multiple processes from having rights to a single resource.

These prior art cache mechanisms work well for most caches. However, they do not operate properly for bi-endian caches. These are caches that have operations with data in either big-endian format and/or little endian format. For example, the number 2 may be represented as the four bit number 0010 in little endian (LE) format, or 0100 in big endian (BE) format.

SUMMARY OF THE INVENTION

These and other objects, features and technical advantages are achieved by a system and method which is able to perform carry look-ahead calculations for a bi-endian adder in a cache memory system.

The inventive adder operates for big endian or little endian formatted data. The adder can add one of +/−1, 4, 8, or 16 to a loaded value from memory. The add operation can be a 4 or 8 byte add operation. The resulting value can then be stored back into memory. The adder may operate in conjunction with an atomic fetch-add instruction.

The inventive adder comprises eight byte adder cells and carry look-ahead (CLA) logic. The adder cells determine which of themselves is the least significant bit (LSB) byte adder cell. The LSB cell then adds one of the increment values, +/−1, 4, 8, or 16, to a loaded value from memory. The other cells add 0x00 or 0xFF, depending upon the sign of the increment value, to a loaded value from memory. Each adder performs two adds, one for a carry-in of 0, and the other for a carry in of 1. Both results are sent to a MUX. The CLA logic determines each of the carries, and provides a selection control signal to each MUX. of the different cells.

The CLA operates according to predetermined equations that take into account, the endianess of the operation, the size (4 byte or 8 byte) of the operation. The CLA logic determines whether an addition has resulted in the generation of a carry in a prior block, and whether the carry is propagated by subsequent byte blocks (if present) into the current block. Also, the negative increment values are achieved by using 1's complement and then adding a 1 through the CLA logic.

It is a technical advantage of the invention to have an adder that operates with both big endian format data and little endian format data.

It is another technical advantage of the invention to be able to add one of the increment values +/−1, 4, 8, or 16 to a loaded value from memory.

It is a further technical advantage of the invention to use logic to form the negative increment values from the 1's complement of the positive values, and to then add one via the CLA logic to form the 2's complement or the negative value.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1A:
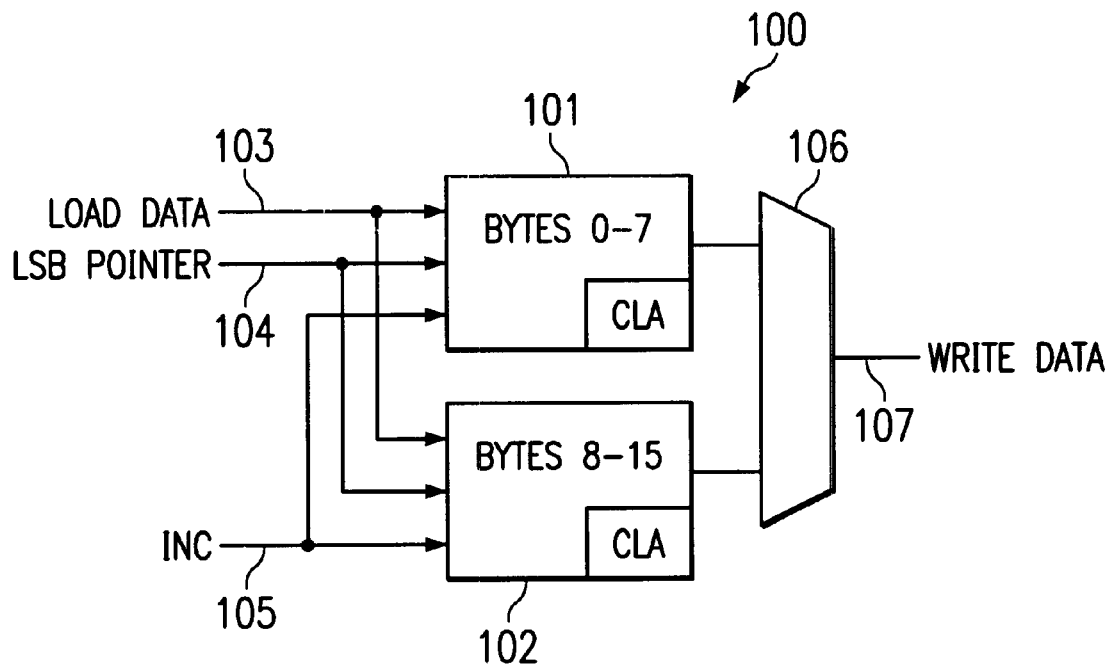
FIGS. 1A and 1B depict a block diagram of the inventive adder.

FIG. 1A depicts the inventive bi-endian adder 100. The adder 100 operates in conjunction with cache memory semaphore instructions, such as fetch-add instructions. The fetch-add instruction requires data from memory to be read 103 and incremented by a value (+/−1, 4, 8, or 16) encoded in an instruction field (inc [2:0] 105) before returning the result to memory 107. This operation is guaranteed to be atomic for all cacheable memory addresses. Also specified in the instruction is the size of the add (either four or eight bytes). Like compare and exchange, the data for this instruction may be in either endianess, big endian (BE) or little endian (LE).

The inventive adder 100, performs the addition function beginning at any of several memory locations. Thus, the inventive adder uses an unaligned adder. Note that the address of the memory data is guaranteed to be naturally aligned (if they are not, an unaligned operand fault is raised by system), thus the complexity of the design is reduced. This means that data from memory 103 will be at most 8 bytes in size (i.e. 0–7, 8–15). Thus, a number will not be 7–14 bytes. In other words, since the carry chain of an add will never cross the Byte 7/8 boundary, the adder can be thought as two independent 64 bit adders 101, 102. Each of the upper and lower adders 101, 102 can be represented by eight 1 byte adders 200, and carry look-ahead logic 201, as shown in FIG. 1B.

The other input used by the inventive adder 100 is the least significant bit (LSB) information. This information comprises the physical address of the load 103, represented by PA[3:0], the size of the operation (4 or 8 bytes), and the endianess of the operation. The LSB determines which byte of the eight bytes will receive the increment, i.e. +/−1, 4, 8, or 16. The other bytes will receive 0's or 1's (depending on the sign bit of the increment) or possible a carry from the LSB byte. Note that the natural alignment also limits the possible LSB to four locations (byte 0, 3, 4, or 7) within the two independent adders. Namely, bytes 0, 3, 4, or 7 in the 'lower' adder 101, and/or bytes 8, 11, 12, or 15 is the 'upper' adder 102. Note that byte 0 can be the LSB byte if the format is LE and the size is either 4 or 8 bytes. Similarly, byte 4 can be the LSB byte if the format is LE and the size is 4 bytes. Thus, byte 3 can be the LSB byte if the format is BE and the size is 4 bytes, and byte 7 can be the LSB byte if the format is BE and the size is either 4 or 8 bytes. The LSB of the upper adder 102 can be similarly selected. Thus, only the adder input pulled from memory is truly arbitrary, as the other input, the increment value, must be: +/−1, 4, 8, or 16. Note that if the LSB byte is 3 or 4, then the adder assumes the operation is a 4 byte operation. If the LSB byte is 0 or 7, then the adder assumes the operation is an 8 byte operation. In this situation, the adder will always perform an 8 byte add, even if the operation is actually a 4 byte add. The other 4 bytes will be filled with junk and ignored.

Figure 1B:
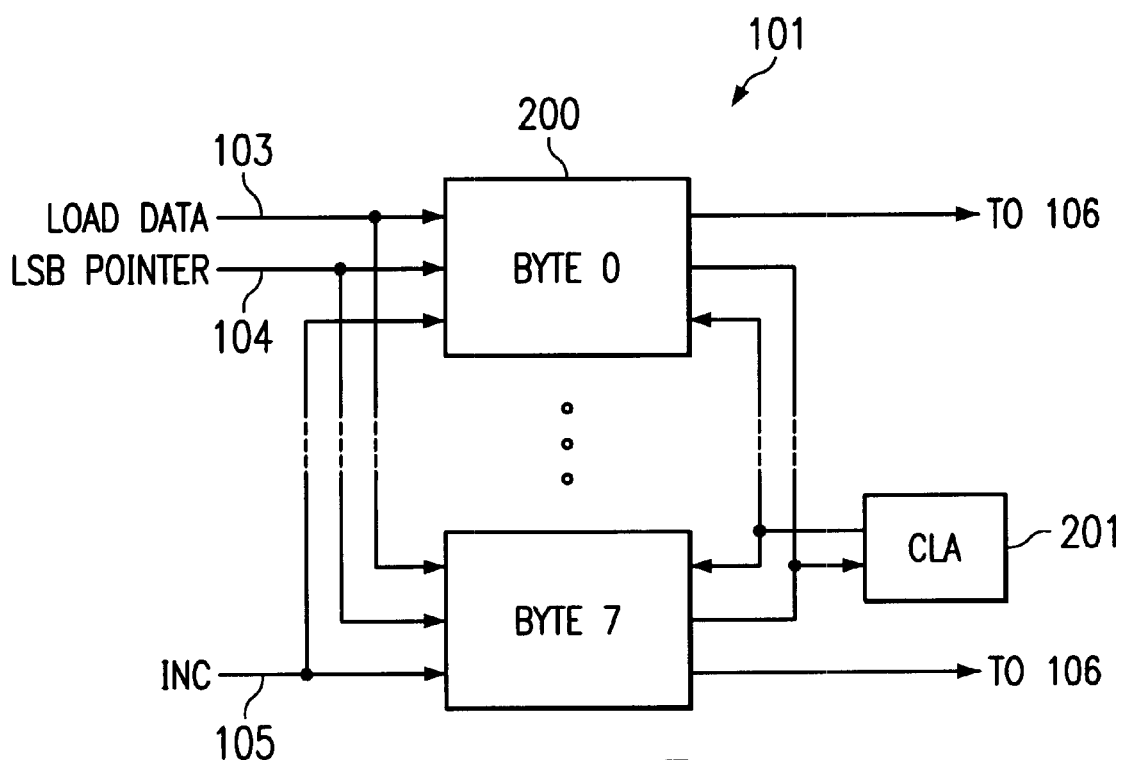
Figure 2:
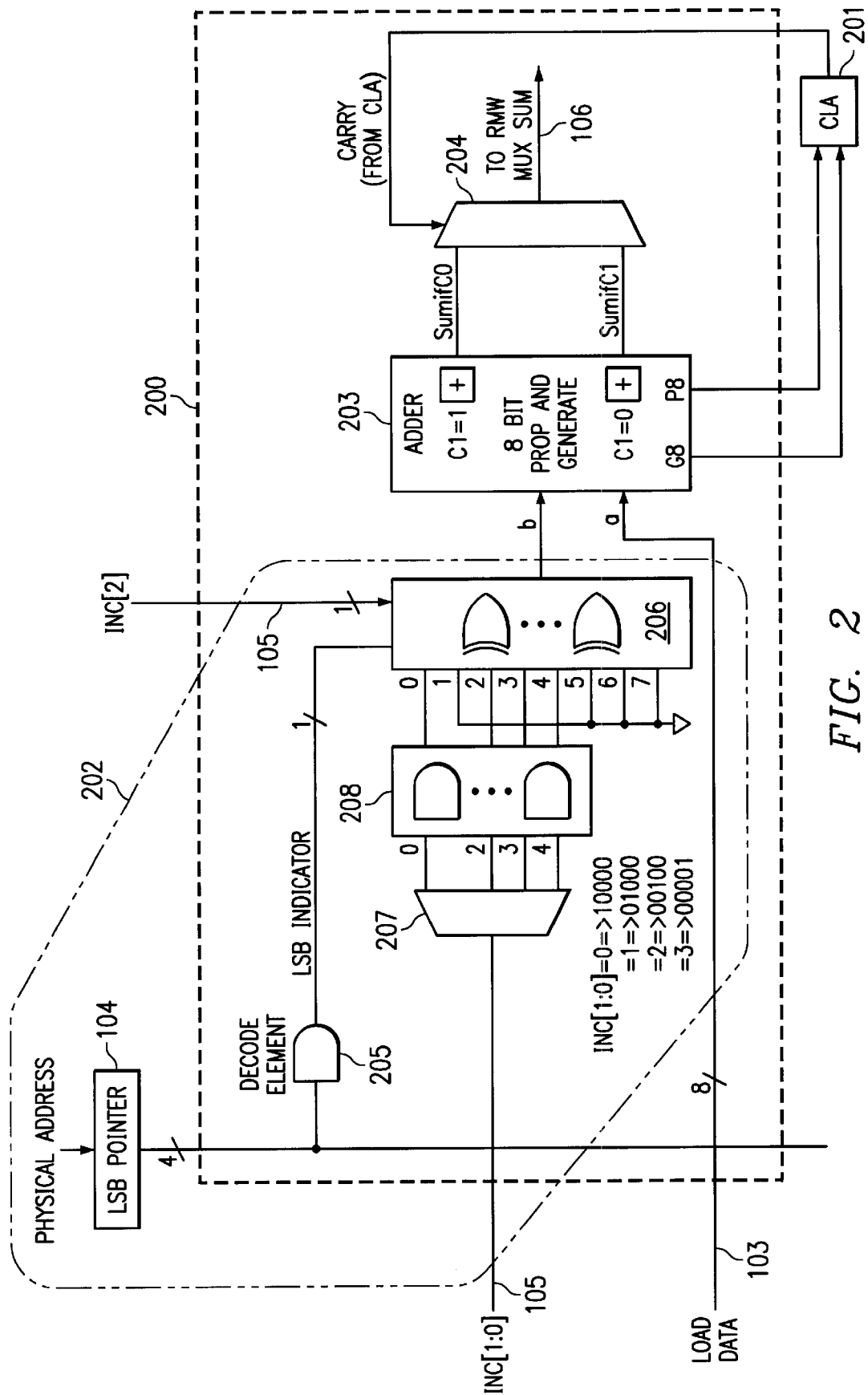
FIG. 2 depicts the internal arrangement for an adder cell of the inventive adder of FIGS. 1A and 1B.

FIG. 2 depicts the internal arrangement 200 for one of the byte adder cells of FIG. 1B. Each adder cell first determines whether it is the LSB block. This determination is ultimately based on the physical address of the load data PA[3:0], the size of the operation (4 or 8 bytes), and the endianess of the operation. If a byte is the LSB byte, then inc[2:0] 105 is used to determine the increment input to adder 203. For all other bytes, the increment adder input is either 0xFF (255) or 0x00 (0) depending on inc[2], which is the sign bit 105s.

The decode element 205 determines if the cell 200 is the LSB byte. The decode element 205 logically ANDs the LSB pointer information 104 with the byte cell number, (i.e. 0, 1, 2, 3, 4, 5, 6, or 7 for the lower adder 101 and 8, 9, 10, 11, 12, 13, 14, or 15 for the upper adder 102). The one bit result is sent to XOR logic 206. The increment information 105 is sent to decoder 207 which converts the 2 bit information into one of four bit streams, name 1 (00001), 4 (00100), 8 (01000), or 16 (10000). These values are sent to XOR logic 206. If the particular cell is the LSB cell, then the increment value is sent to the adder 203. The sign bit inc[2] is also sent to the XOR logic 206. If inc[2] is 0, then the increment value is positive, and if inc [2] is 1, then the increment value is negative. Thus, values of +/−1, 4, 8, or 16 can be sent to the adder 203. Note that if inc[2] is 0 (positive sign) and the cell is not the LSB, then 0x00 (all 0's) is sent as the increment value, and if inc[2] is 1 (negative sign) and the cell is not the LSB, then 0xFF (all 1's) is sent as the increment value. Note that the individual bits of each byte are always in one format, e.g. LE, while the bytes may be arranged in either format, BE or LE.

Note that if inc [2] is 1, then the XOR logic reverses the bit values for each of the bits of the decoded increment value. In other words, the XOR logic performs a 1's complement on the decoded increment value. For example, 00001 becomes 11110. For a true negative value to be obtained, a one or 00001 must be added to the 1's complement number to make a 2's complement number, thus converting a positive number into a negative number, e.g. +1 (00001) to −1 (11111). This additional one is added in the below equations by the CLA logic 201. For example, in CIN0, the term LE INC[2] would add 1, if in little endian format. Similarly, in CIN7, the term BE INC[2] would add 1, if in big endian format. Similar terms exist for the carry-ins for bytes 3 and 4, if in a 4 byte operation. Thus, the carry-in for the LSB byte is used to complete the 2's compliment for the negative number. Note that since this is the LSB byte, it will not have any other carry-in.

The adder 203 sums together its two inputs, a and b, wherein a is the load data 103, and b is the increment value from XOR logic 206. The adder 203 performs two sums, the first assuming a carry-in of 0, and the second assuming a carry-in of 1. Both of these sums are sent to MUX 204. The carry look-ahead (CLA) logic 201 calculates the proper carry, and selects the proper output from the MUX 204. The output from MUX 204 is sent to MUX 106, which is used in writing the data back to cache memory or to another destination.

The CLA 201 receives information from each cell of the eight cells, namely whether the addition performed by adder 203 of each cell, has resulted in the particular cell generating or propagating a carry bit. For a particular cell to form a propagate, the cell must have a sum of 255. Thus, a carry in of one will cause the cell to have a carry out of one (to the next cell), and thus propagate a carry in. This information is sent to the CLA as P8. For a particular cell to form a generate, the cell must have a sum of 256 (or greater). Then, the cell generates a carry out. This information is sent to the CLA as G8. The CLA in turn, calculates whether each cell will be receiving a carry in. Note that the other bits, i.e. bits 0–7, are internal to the adder, only the ninth bit, bit 8, is the carry bit. The cells use this information as MUX selection control information to select the addition that included a carry in of 1 or a carry in of 0.

The CLA contains logic that is described by the following equations. In the equations, the terms mean as follows: P8Bx: the propagate term out of byte cell x; G8Bx: the generate term out of byte cell x; BE: 1 if big endian mode/0 for little endian; LE: 1 if little endian mode/0 for big endian mode; INC[2]: 1 if negative sign on the increment value/0 if positive sign on the increment value; ADD4: four byte add operation; ADD8: eight byte add operation; and CINx: the values of carry in sent back to that particular byte cell. Also in the equations, there are two double word propagation terms, note that BE/LE has no effect on these terms: P32DW0=P8B0 P8B1 P8B2 P8B3; and P32DW1=P8B4 P8B5 P8B6 P8B7. Further in the equations, there are two double word generation terms, note that BE/LE has no effect on these terms: G32DW0=G8B0 P8B1 P8B2 P8B3+G8B1 P8B2 P8B3+G8B2 P8B3+G8B3; and G32DW1=G8B7 P8B6 P8B5 P8B4+G8B6 P8B5 P8B4+G8B5 P8B4+G8B4.

The carry in equations are calculated by the CLA 203 based on the below equations and the G8 and P8 from each of the adder cells. The resulting CINxs are sent back to their respective cells as MUX 204 selection control signals. Note that equations for the upper adder 102 can be developed by adding 8 to the x values of Bx and CINx.

CIN0=LE INC[2]+BE (P8B1 P8B2 G8B3+P8B1 G8B2+G8B1)+
BE ADD4 P8B1 P8B2 P8B3 INC[2]+BE ADD8 P8B1 P8B2
P8B3 (G32DW1+P32DW1 INC[2])

CIN1=LE (INC[2]P8B0+G8B0)+BE (P8B2 G8B3+G8B2)+BE
ADD4 P8B2 P8B3 INC[2]+BE ADD8 P8B2 P8B3 (P32DW1
INC[2]+G32DW1)

CIN2=LE (INC[2]P8B0 P8B1+G8B0 P8B1+G8B1)+BE G8B3+
BE ADD4 P8B3 INC[2]+BE ADD8 (P8B3) (P32DW1 INC[2]+
G32DW1)

CIN3=LE (INC[2]P8B0 P8B1 P8B2+G8B0 P8B1 P8B2+G8B1
P8B2+G8B2)+BE ADD4 INC[2]+BE ADD8 (P32DW1 INC
[2]+G32DW1)

CIN4=LE ADD4 INC[2]+LE ADD8 (P32DW0 INC[2]+
G32DW0)+BE (INC[2]P8B7 P8B6 P8B5+G8B7 P8B6 P8B5+
G8B6 P8B5+G8B5)

CIN5 LE G8B4+LE ADD4 INC[2]P8B4+LE ADD8 P8B4
(P32DW0 INC[2]+G32DW0)+BE (INC[2]P8B7 P8B6+G8B7
P8B6+G8B6)

CIN6=LE (G8B4 P8B5+G8B5)+LE ADD4 INC[2]P8B4 P8B5+LE
ADD8 P8B4 P8B5 (P32DW0 INC[2]+G32DW0)+BE (INC[2]
P8B7+G8B7)

CIN7=LE (G8B4 P8B5 P8B6+G8B5 P8B6+G8B6)+LE ADD4
INC[2]P8B4 P8B5 P8B6+LE ADD8 P8B4 P8B5 P8B6
(P32DW0 INC[2]+G32DW0)+BE INC[2]

In analyzing the above equations, terms separated by a plus, indicates a logical OR, whereas the components of a terms, indicate a logical AND, e.g. BE INC[2] means both big endian format and a negative increment for the term of BE INC[2] to be 1. Note that certain terms in the above equations become active based upon the endianess, i.e. BE or LE, and the size of the add, i.e. 4 byte or 8 byte.

Note that the processing of the adder cells can be pipelined, i.e. performed in stages. For example, portion 202 can be performed in one pipeline stage, while 203 can be performed in another, and 204 in a third stage.

Also, note that the inventive adder has been described in terms of a semaphore fetch-add instruction. However, the inventive adder may be used with other instructions. The inventive adder can be configured to increment by other values than +/−1, 4, 8, and 16, by changing the logic of blocks 208 and 206.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for performing bi-endian addition operations using data loaded from memory as a first addend and an increment value as a second addend, wherein the data comprises a plurality of bytes and is identified by an address, the system comprising:
   a plurality of byte adder cells, wherein each cell comprises:
      logic for computing the increment value;
      logic for adding the increment value, the data, and a carry of zero to produce a first result;
      logic for adding the increment value, the data, and a carry of one to produce a second result; and
      selection logic for selecting between the first result and the second result; and
   carry logic that determines the carry for each cell of the plurality of cells and provides each carry to its respective selection logic.

2. The system of claim 1, wherein the logic for computing the increment value comprises:
   logic for determining whether the cell is the least significant byte cell.

3. The system of claim 2, wherein the plurality of cells is eight, and the cells are identified as cell 0, cell 1, cell 2, cell 3, cell 4, cell 5, cell 6, and cell 7, and wherein the logic for determining whether the cell is the least significant byte cell comprises:
   logic for comparing whether a start address matches the cell number.

4. The system of claim 1, wherein the logic for computing the increment value further comprises:
   logic for receiving an input value selected from a predetermined group of values;
   logic for forming the increment value from the input value if the cell is the least significant byte cell; and
   logic for forming the increment value from a null value if the cell is not the least significant byte cell.

5. The system of claim 4, wherein:
   the input values are selected from the group consisting of: +1, −1, +4, −4, +8, −8, +16, and −16.

6. The system of claim 4, wherein the logic for forming the increment value from the input value comprises:
   logic for performing a one's complement of the input value if a sign of the input value is negative; and
   logic for forming the increment value from the one's complement of the input value if the cell is the least significant byte cell and the sign of the input value is negative.

7. The system of claim 6, wherein the carry logic comprises:
   logic for determining the carry for each cell of the plurality of cells based on the sign of the input value, such that if the input value is negative and the cell is the least significant byte cell, then the carry is set to one, thereby forming a two's complement value of the input value.

8. The system of claim 4, wherein:
   the null value is a plurality of logical 0's if a sign of the input value is positive; and
   the null value is a plurality of logical 1's if the sign of the input value is negative.

9. The system of claim 1, wherein the data is formatted in one of big endian format and little endian format, and wherein the carry logic comprises:
   logic for determining the carry for each cell of the plurality of cells based on an endian signal indicating the format of the data.

10. The system of claim 1, wherein the data is sized as one of equal to the size of the plurality of adder cells and less than the size of the plurality of adder cells, and wherein the carry logic comprises:
    logic for determining the carry for each cell of the plurality of cells based on a size signal indicating the size of the data.

11. A method for performing bi-endian addition operations using data loaded from memory as a first addend and an increment value as a second addend, wherein the data comprises a plurality of bytes and is identified by an address, wherein the method operates with a plurality of adder cells, and each a byte of the plurality of bytes is associated with a cell, the method comprises the steps of:
    (a) computing the increment value;
    (b) adding the increment value, the data, and a carry of zero to produce a first result;
    (c) adding the increment value, the data, and a carry of one to produce a second result;
    (d) selecting, via selection logic, between the first result and the second result;
    (e) repeating the steps of (a), (b), (c) and (d) for each of the plurality of cells; and
    (f) determining the carry for each cell of the plurality of cells and providing each carry to its respective selection logic.

12. The method of claim 11, wherein the step (a) comprises the step of:
    determining whether the cell is the least significant byte cell.

13. The method of claim 12, wherein the plurality of cells is eight, and the cells are identified as cell 0, cell 1, cell 2, cell 3, cell 4, cell 5, cell 6, and cell 7, and the step of determining whether the cell is the least significant byte cell comprises the step of:
    comparing whether a start address matches the cell number.

14. The method of claim 11, wherein step (a) further comprises the steps of:
    receiving an input value selected from a predetermined group of values;
    forming the increment value from the input value if the cell is the least significant byte cell; and
    forming the increment value from a null value if the cell is not the least significant byte cell.

15. The method of claim 14, wherein:
    the input values are selected from the group consisting of: +1, −1, +4, −4, +8, −8, +16, and −16.

16. The method of claim 14, wherein the step of forming the increment value from the input value comprises the steps of:
    performing a one's complement of the input value if a sign of the input value is negative; and forming the increment value from the one's complement of the input value if the cell is the least significant byte cell and the sign of the input value is negative.

17. The method of claim 16, wherein the step (f) comprises the steps of:

determining the carry for each cell of the plurality of cells based on the sign of the input value, such that if the input value is negative and the cell is the least significant byte cell, then the carry is set to one, thereby forming a two's complement value of the input value.

18. The method of claim 14, wherein:

the null value is a plurality of logical 0's if a sign of the input value is positive; and the null value is a plurality of logical 1's if the sign of the input value is negative.

19. The method of claim 11, wherein the data is formatted in one of big endian format and little endian format, and wherein the step (f) comprises the step of:

determining the carry for each cell of the plurality of cells based on an endian signal indicating the format of the data.

20. The method of claim 11, wherein the data is sized as one of equal to the size of the plurality of adder cells and less than the size of the plurality of adder cells, and wherein the step (f) comprises the step of:

determining the carry for each cell of the plurality of cells based on a size signal indicating the size of the data.

* * * * *